Patented Aug. 5, 1952

2,606,125

UNITED STATES PATENT OFFICE 2,606,125

COMPOSITION FOR INSERTING INTO THE INNER TUBES OF VEHICLE TIRES FOR THE PURPOSE OF AVOIDING THE EFFECT OF PUNCTURES

Antonio Covelli, Buenos Aires, Argentina

No Drawing. Application October 15, 1951, Serial No. 251,446

2 Claims. (Cl. 106—33)

This invention refers to a composition for inserting into the inner tubes of vehicle tyres for the purpose of avoiding the effect of punctures.

An object of the invention is to provide an improved mixture which in a fluid state can be injected or otherwise inserted into the inner tube of a tyre and will prevent the deflation of the tyre when punctures occur.

A further object is to provide a substance, part of which when rotated within the inner tube of a tyre will adhere to the inner surface of the tube and another part of which is adapted to float or remain in a loose condition within the tyre.

A further object is to provide a substance for the purpose mentioned which contains at least one solid ingredient of light and buoyant nature so that when a puncture occurs a portion of the substance containing the said ingredient will be easily drawn by the rush of air in the direction of the puncture.

A further object is to provide a composition for the purpose specified containing at least one ingredient to prevent the fermentation of the mixture.

The invention provides a composition of matter which will tend to preserve the rubber of the inner tube and is partly of a gelatinouslike nature.

The mixture or composition of matter in accordance with the invention when inserted into an inner tube by any suitable means will close any puncture, perforation or orifice, the gelatinouslike deposit formed on the inner surface of the tube tending to close such puncture by the air suction and a portion of the light floating material will be attracted to the inner mouth of the hole or puncture in the inner tube and the said hole or puncture is immediately closed. The continued rotation of the wheel will spread the gelatinouslike layer completely over the puncture and the air in the tube will be prevented from escaping.

In accordance with the invention, the mixture or composition of matter contains dextrin, gum arabic, talc, sulphur, ground cork and asbestos powder. The components mentioned are mixed with a suitable quantity of water to form a fluid substance which can easily be injected into the inner tube of a tyre.

The following proportions and components have been found to produce a composition which is adapted for the purpose specified:

|  | Grams |
|---|---|
| Dextrin | 30 to 35 |
| Gum arabic | 12 to 15 |
| Venetian talc | 12 to 15 |
| Flowers of sulphur | 10 to 15 |
| Ground cork | 4 to 6 |
| Powdered asbestos | 1.50 to 2 |

300 grams of the mixture mentioned above are mixed with 500 c. cms. of water or 450 grams can conveniently be mixed with 900 c. cms. of water to form a fluid which can be inserted into the inner tube of a tyre. The quantity of fluid to be inserted will depend on the size of the tyre. The size of particles of cork may be from 1 to 3 cubic millimetres.

The dextrin and gum arabic will prevent the mixture from hardening; the Venetian talc and flowers of sulphur for the purpose of preserving the rubber and avoiding fermentation or acidity; the cork being a light material will tend to float within the tube and asbestos is used as a filler.

It is not desired to restrict the invention to the use of any exact proportion of water since such proportion will vary widely according to conditions of climate and other factors.

Having thus described my invention and the manner in which same may be performed, by way of example, I declare that I claim:

1. A composition for inserting into the inner tubes of vehicle tyres for the purpose of avoiding the effect of punctures, composed of a mixture of dextrin, gum arabic, talc, flowers of sulphur, powdered cork and asbestos, which when mixed with a suitable proportion of water provides a fluid material for the purpose specified.

2. A composition for inserting into the inner tubes of vehicle tyres for the purpose of avoiding the effect of punctures, composed of a mixture of the following components in the approximate proportions specified:

|  | Grams |
|---|---|
| Dextrin | 30 to 35 |
| Gum arabic | 12 to 15 |
| Venetian talc | 12 to 15 |
| Flowers of sulphur | 10 to 15 |
| Ground cork | 4 to 6 |
| Powdered asbestos | 1.50 to 2 | which when mixed with a suitable proportion of water provides a fluid material for the purpose specified.

ANTONIO COVELLI.

REFERENCES CITED

The following references are of record in the file of this patent:

FOREIGN PATENTS

| Number | Country | Date |
|---|---|---|
| 472,934 | France | Aug. 27, 1914 |
| 18,065 | Great Britain | July 3, 1897 |
| 321,404 | Great Britain | Nov. 4, 1929 |